Feb. 22, 1966     J. A. BRADSTREET     3,236,677

FACINGS

Filed Oct. 6, 1961

A heat cured water insoluble release coating formed in situ of an initially water soluble Phenolic Aldehyde and a complex compound of Werner type in which a trivalent Nuclear Chromium Atom is coordinated with an Acyclic Carboxylic Acid having at least twelve Carbon Atoms.

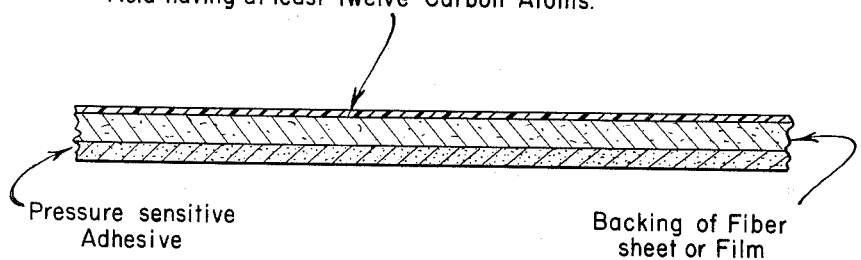

Pressure sensitive Adhesive

Backing of Fiber sheet or Film

INVENTOR
JAMES A. BRADSTREET
BY
Harold L. Warre
ATTORNEY

United States Patent Office 3,236,677
Patented Feb. 22, 1966

3,236,677
FACINGS
James A. Bradstreet, New Brunswick, N.J., assignor to Johnson & Johnson, a corporation of New Jersey
Filed Oct. 6, 1961, Ser. No. 143,299
16 Claims. (Cl. 117—68.5)

The present invention relates to release coatings and more particularly to flexible sheet material such as pressure-sensitive adhesive-coated sheets and interliners for pressure-sensitive adhesive-coated sheets having water insoluble release coatings thereon containing in part a complex compound of the Werner type in which a trivalent nuclear chromium atom is coordinated with an acyclic carboxylic acid having at least 12 carbon atoms.

In Patent No. 2,273,040 is described a class of complex chromium compounds of the Werner type which are utilized in the present invention. Although in this particular patent these chromium compounds are described primarily as being excellent water repellent materials, it has been found that these compounds also have certain release properties that make them desirable for use as release coatings for surfaces which are to be placed in contact with pressure-sensitive adhesives. Although these complex chromium salts are found to release readily from pressure-sensitive adhesive coatings, substantial difficulty has been encountered when attempts are made to release coat surfaces with these complexes. As stearato chromic chloride is an excellent example of these complex chromium salts, stearato chromic chloride will be used in describing the practice of the present invention. However, the invention is not limited thereto, and other of the complex compounds of the Werner type in which a trivalent nuclear chromium atom is coordinated with an acyclic carboxylic acid having at least 12 carbon atoms may be used in place thereof. Some of these compounds are sold commercially in alcoholic solution under the trade name "Quilon," "Quilon" S being the chromium stearic acid complex and "Quilon" M being the myristic acid complex.

Although a surface treated with these complex chromium salts releases readily from a pressure-sensitive adhesive, considerable difficulty has been encountered in obtaining a satisfactory coating of the complex chromium salt. Control of the weight of the stearato chromic chloride coating is very critical and slight changes in coating weight result in drastic changes in the release properties and the tack retention characteristics. Unless the stearato chromic chloride is present in sufficient quantities to give release, the release effect obtained is only slightly better than where no chromium complex is used at all. However, when the chromium complex, such as stearato chromic chloride, is increased in sufficient amount to give release, frequently the result is that the release obtained is too great, the release-coated surface separating too readily from the pressure-sensitive adhesive. This is well illustrated in the use of these materials as release coatings on the backs of pressure-sensitive adhesive tapes. With rolls of pressure-sensitive adhesive tape where the side opposite to that containing the adhesive is treated with stearato chromic chloride and sufficient stearato chromic chloride is used to obtain release, many of the rolls of tape are found to release so readily that on winding the tape unwinds so rapidly that there is a backlash, with the result that the unwound tape becomes entangled with itself causing substantial waste.

Another difficulty encountered with the chromium complexes is their tendency to detackify pressure-sensitive adhesives when in contact with pressure-sensitive adhesives for several months.

Films of polyethylene terephthalate, available on the market under the name "Mylar," have found increasing use as pressure-sensitive adhesive tape backings, particularly in the electrical field. When attempts are made to use stearato chromic chloride or other of the chromium complexes as release coatings on these films, very poor anchorage is obtained. This results in substantial transfer of the release coating to the pressure-sensitive adhesive with which it is placed in contact. This has made the use of these chromium complexes with such tape backings unsatisfactory.

In using stearato chromic chloride and other of the chromium complex type compounds in treating surfaces, it is the practice to add a buffer solution to the coating composition to assure proper hydrolysis and polymerization. Accordingly, in most literature describing the use of such compounds it is recommended that the pH of the solution be adjusted from about 2.5 to 3.2 by adding a buffer solution containing, for example, urea, 16.5%; sodium formate, 5.0%; and formic acid, 0.2%. Although this is the general buffering solution used, other buffering solutions may be employed. However, this results in the formation of salts which in turn are detrimental to the electrical properties of the tape. Where the tape is to be used for electrical purposes, these salts act to conduct current and thus destroy the insulating value of the tape.

It has now been discovered that the above difficulties with the chromium complex type compounds can be avoided and all of the advantageous release characteristics of these compounds preserved if the stearato chromic chloride or other chromium complex is used together with a phenolic aldehyde resin and the coating of phenolic aldehyde resin-chromium complex is cured at an elevated temperature to cause polymerization of the resulting film coating.

In the drawing a schematic cross-sectional side view of a section of pressure-sensitive adhesive tape is illustrated in which a tape backing is formed of flexible film material such as "Mylar" or a sized paper and contains on one surface a coating 2 of pressure-sensitive adhesive and on its other surface a heat cured release coating 3 made in accordance with the present invention.

The release coatings of the present invention are quite thin, generally not exceeding a coating solids weight of about 0.05 oz. per square yard of the treated material. Because of the extremely thin coatings used, the release coating should be spread on a relatively smooth non-absorbent surface. Where the release coating of the present invention are placed on film materials, such as "Mylar" film, they are placed directly onto the film surface. However, where papers or other fibrous materials are to be coated with the release composition of the present invention the surface should first be prepared by sizing to give a relatively smooth impervious surface. The size used may be any conventional back sizing material which will bond to the backing base and will give a relatively smooth surface.

With pressure-sensitive adhesive tapes, it is desirable to have an unwinding tension generally within the range of about 10 to 35 oz. of pull per inch width at an unwinding speed of about 50 ft. per minute. With stearato chromic chloride alone, for example, it is extremely difficult to obtain this desired unwind tension. When stearato chromic chloride is used in amounts sufficient to give release tensions within the range of 10 to 35 oz., variations of as little as 0.2% of the stearato chromic chloride in the coating solution will cause release tension variations of as much as 15 oz. Since degree of release varies drastically with variations in the amount of stearato chromic chloride present, it is readily apparent that only slight variations in the thickness of the coating result in substantial variations in the release characteristics obtained.

With the cured phenol aldehyde resin-stearato chromic chloride coatings, however, the concentrations of the solids in the coating solution can be increased as much as threefold and the release maintained within the desired range of about 10 to 35 oz. pull per inch. This gives substantially more latitude during the coating operation.

In practicing the present invention, the phenol aldehyde resin used should be a water soluble heat-reactive phenol aldehyde resin, the resin being readily dispersible in water at a neutral pH or above. Examples of such reactive phenolic resins are those formed by the alkaline condensation of formaldehyde and phenol in a ratio of from about 1.1 to about 3 moles of formaldehyde per mole of phenol and the reaction arrested while the resin is still in the heat advancing stage. Substituted phenols, such as resorcinol or cresol, may be employed, and other aldehydes than formaldehyde, such as furfuraldehyde, may be used. The pH of such resins usually ranges from 7 to 11. Examples of such phenolic resins are the "Durez" resins such, for example, as "Durez" 14798 (63–67% solids) manufactured by Durez Chemical Co., a subsidiary of Hooker Chemical Company.

Although stearato chromic chloride has been used in describing the invention, as previously stated, this is only one example of the complex compounds of the Werner type in which a trivalent nuclear chromium atom is coordinated with an acyclic carboxylic acid having from 12 to 26 carbon atoms inclusive. These chromium salts of acyclic carboxylic acid may be any member of this group having at least 12 carbon atoms, for example, chromium laurate, chromium oleate, chromium palmitate, chromium stearate or chromium behenate. Chromium stearate is a preferred member of this group and the present invention, as previously stated, is described with particular reference thereto, although no limitation is intended thereby.

The chromium stearate and other chromium salts preferably are employed in the form of their water soluble, metal salts, for example, chromium stearato chloride which, as previously indicated, is sold under the trade name "Quilon." This is a water soluble complex compound of the Werner type in which a trivalent nuclear chromium atom is coordinated with a stearato group. It is commercially available as a dark green, alcoholic solution having a solids content of about 40% by weight. Its preparation and structure are fully disclosed in U.S. Letters Patent No. 2,273,040.

The phenol aldehyde resin should be present in the coating solution in amounts of about 0.3 to 3 parts by weight of phenol aldehyde resin to 1 part by weight of the stearato chromic chloride. In preparing the coating composition, it is preferred that the water soluble phenol aldehyde resin first be diluted with water and then added to an alcohol solution of the stearato chromic chloride. It is generally preferred that the coating solution contain about 1 to 2% by weight of solids, although this can be varied to suit the particular coating operations used.

Although the coating may be obtained from a water solution, it is generally preferred to use a water alcohol solution with the alcohol being predominant, isopropyl alcohol preferably being used. The purpose for the excess alcohol is both to assure that the stearato chromic chloride is stable in the solution and to obtain desirable wetting of the surface on which the coating is being placed. This is particularly important where the surface being coated is, for example, "Mylar" film.

It has been found that in order to obtain the anchorage of the coating and the release characterisics desired it is necessary to heat cure the coating composition after it has been applied to the backing. This curing should be carried out generally at a temperature of about 275° F. or higher. Where cured at 275° F., the time of curing should be about 1 minute. Where higher curing temperatures, such, for example, as about 350° F. are used, appreciably shorter curing times can be employed. Temperatures much below 275° F. are impractical commercially because of the long curing period necessary. As previously stated, with "Mylar" film the coating is applied directly to the film. However, where the coatings of the present invention are used with paper, the paper should first be treated with a back size material so as to give the desired relatively smooth impervious surface for receipt of the release coating film. Materials suitable for such back size may be any of the conventional back size materials, such as cellulose acetate coatings, epoxy resin coatings and melamine aldehyde alkyd coatings, and the like, the coatings generally preferred being those of the melamine aldehyde alkyd type.

In practicing the present invention, the release coating is applied with conventional coating equipment to give the desired coating weight. As previously stated, the coating is preferably applied in a very thin film. The backing with the release coating thereon is then dried, drying generally being done at a temperature of about 250° F. for about 30 or 40 seconds in conventional drying apparatus. After drying, the backing film is heated to the curing temperature, as previously indicated, to cure the phenol aldehyde resin and stearato chromic chloride onto the coated backing. Although the chemical reaction is not clearly understood, it is believed that not only is the phenol aldehyde resin and the stearato chromic chloride cured through this heat curing step but that cross-linking occurs between the phenol aldehyde resin and the stearato chromic chloride, resulting in the substantially improved tack retention which is obtained with the release coatings of the present invention when in contact with pressure-sensitive adhesives and the other advantageous characteristics of such release coatings.

The degree of release obtained can be varied within the desired range of about 10 to 35 oz. by varying the ratio of phenol aldehyde resin to stearato chromic chloride in the coating composition. The higher ratios of stearato chromic chloride to the phenolic resin given the higher release results.

The practice of the invention is further illustrated by the following examples. These examples are given for the purpose of illustration only, and the invention is not limited thereto.

*Example I*

Using a flat, non-creped 4-mill thick impregnated paper, a back size is placed on the paper by conventional knife spreading. The coated paper is then dried. The back size coating is a melamine formaldehyde alkyd type containing 36 parts by weight of di-basic acid alkyd oil modified resin, 120 parts by weight melamine formaldehyde resin and 220 parts by weight solvent, the primary solvent being toluene. This is spread on the paper at a weight of about 0.3 to 1 oz. solids per square yard and then dried in conventional drying apparatus at a temperature of about 270 to 385° F. The surface of the paper after coating with the back size has a smooth, glossy appearance.

The release coating solution is then prepared by dissolving the phenolic resin in water and then adding this water solution of phenolic resin to an isopropyl alcohol solution of "Quilon" S (stearato chromic chloride). The final solution has a concentration of 0.65 part by weight phenolic, 0.70 part by weight "Quilon" S, 25.4 parts by weight water and 76.3 parts by weight isopropyl alcohol. The phenolic resin used is a phenol formaldehyde resin sold under the trade designation Durez 14798.

The solution of phenolic resin and "Quilon" S is then spread with a knife coater onto the sized surface of the paper backing to a coating weight of 0.02 oz. solids per square yard of the backing material. The coated paper is then dried at a temperature of 250° F. and then passed through a curing oven where it is maintained at a temperature of 350° F. for 40 seconds.

The release-coated paper is then coated on the side opposite to that containing the release coating with a rubber base adhesive. A rubber base adhesive composition is:

| | |
|---|---|
| Milled pale crepe rubber | 100 |
| Polybetapinene resin | 75 |
| Petroleum oil | 5 |
| Polymerized trimethyldihydroquinoline | 2 |

Rolls formed of the adhesive-coated paper with the release-coated back size have excellent release properties even after extended periods of aging.

*Example II*

A 30-pound saturating grade impregnated crepe paper is coated with a back size coating composition of the type previously described in Example I. The solids content of the back size coating solution, however, is slightly lower than that used in Example I, the solids content being about 30% of the coating solution, the coating weight of the back size being about 0.3 oz. per square yard. After drying, the back size coating covers the minutes voids and gives the appearance to the crepe paper of smooth hills and valleys rather than the smooth, glossy surface obtained with the flat paper. This smooth undulating surface of the back sized crepe is then coated with the release coating in much the same manner as described in Example I.

The solids content in the release coating in this instance, however, is 0.62 part by weight phenolic resin, 0.35 part by weight "Quilon" S, 25.4 parts by weight water and 75.6 parts by weight isopropyl alcohol. This release solution is coated onto the back sized surface of the crepe paper in the same manner as in Example I and to approximately the same coating weight. The release-coated crepe paper is then dried and cured in the manner described in Example I. The surface of the crepe paper opposite to the release-coated surface is then coated in the conventional manner with a rubber base pressure-sensitive adhesive. A rubber base pressure-sensitive adhesive is:

| | |
|---|---|
| Milled smoked sheet rubber | 100 |
| Zinc oxide | 50 |
| Dehydrogenated rosin | 75 |
| Sym. di-beta-napthyl-paraphenylene-diamine | 2 |
| Lanolin | 10 |

The resulting tapes show good release characteristics even after extended periods of aging, and no detackification is observed.

In a similar manner, a crepe paper of the type described is coated on both sides with a back size and then both sides are coated with the release coating of phenolic resin and "Quilon" S which is cured. The resulting release-coated crepe paper is found to be an excellent interliner for double-face pressure-sensitive adhesive tape.

*Example III*

A 2-mill "Mylar" film is coated directly with the release coating, the release coating used containing on a solids basis 0.62 part by weight phenolic resin, 0.70 part by weight "Quilon" S, 25.4 parts by weight water and 76.3 parts by weight isopropyl alcohol, the "Quilon" S and the phenolic resin being of the same type as used in Example I. The water-alcohol solution of the phenolic resin and "Quilon" S is spread at a coating weight of 0.002 oz. per square yard of "Mylar" surface. The coated "Mylar" film is then dried at 250° F., but the curing of the "Quilon" S and the phenolic resin coating is done at 290° F. for 12 seconds.

The side of the "Mylar" film opposite to that coated with the release coating is then coated with a pressure-sensitive adhesive by conventional coating methods. A pressure-sensitive adhesive is:

| | |
|---|---|
| Butadiene-styrene copolymer (Butadiene-styrene ratio 70:30, Mooney value 50) | 50 |
| Smoked sheet | 50 |
| Ester of hydrogenated rosin | 50 |
| Polymerized trimethyldihydroquinoline | 2 |
| Petroleum oil | 20 |

The resulting tape has excellent release properties and aging characteristics. Also, the tape is found to have excellent insulating properties and is exceptionally suitable for use as an electrical tape.

Any of the conventional pressure-sensitive adhesives may be employed in practicing the present invention, the release coating being usable therewith. This includes both the rubber base adhesives of natural and synthetic rubbers as well as the acrylate and the polyvinyl ether base adhesives.

Although the present release coating compositions have been described in connection with use as release coatings for backings of pressure-sensitive adhesive-coated tapes and as release coatings for paper or other flexible interliners to be used with pressure-sensitive adhesive tapes, the invention is not limited thereto. The release coatings of the present invention may be used for coating any surface where the surface is to be placed in contact with conventional pressure-sensitive adhesives where it is desired to protect the adhesive surface and later to remove the pressure-sensitive adhesive from its protecting surface.

Having thus described my invention, I claim:

1. A flexible fiber sheet having at least one surface adapted to be placed in contact with a pressure-sensitive adhesive and readily releasable therefrom, said surface containing a non-absorbent base coating thereon bonded to the surface of said sheet and a thin heat cured water insoluble release coating, on said base coating, formed in situ of an initially water soluble phenolic aldehyde and a complex compound of the Werner type in which a trivalent nuclear chromium atom is coordinated with an acyclic carboxylic acid having at least 12 carbon atoms.

2. A flexible fiber sheet of claim 1 in which said base coating is a melamine aldehyde alkyd resin.

3. A flexible fiber sheet of claim 1 in which said fiber sheet is paper.

4. A flexible fiber sheet of claim 3 in which said paper is a crepe paper.

5. An interliner for separating pressure-sensitive adhesive-coated surfaces comprising a crepe paper having on each side a non-absorbent base coating bonded to the surface of said paper and, bonded to said base coating, a thin heat cured water insoluble release coating formed in situ of an initially water soluble phenolic aldehyde and a complex compound of the Werner type in which a trivalent nuclear chromium atom is coordinated with an acyclic carboxylic acid having at least 12 carbon atoms.

6. A protective cover for pressure-sensitive adhesive surfaces comprising a base having a heat cured water insoluble release coating thereon formed in situ of an initially water soluble phenolic aldehyde resin and a complex compound of the Werner type in which a trivalent nuclear chromium atom is coordinated with an acyclic carboxylic acid having at least 12 carbon atoms, said phenol aldehyde resin being present in 0.3 to 3 parts by weight for each part by weight of said complex compound of the Werner type.

7. A protective cover of claim 6 in which said base is a free film having a melting temperature above 275° F.

8. A flexible sheet of claim 8 in which said free film is a polyethylene terephthalate film.

9. A pressure-sensitive adhesive tape of claim 6 in which said complex compound of the Werner type is stearato chromic chloride.

10. A pressure-sensitive adhesive tape comprising a backing, a pressure-sensitive adhesive coating on one side of said backing and, on the other side of said backing, a heat cured water insoluble release coating formed in situ of an initially water soluble phenolic aldehyde resin and a complex compound of the Werner type in which a triavalent nuclear chromium atom is coordinated with an acyclic carboxylic acid having at least 12 carbon atoms, said phenol aldehyde resin being present in 0.3 to 3 parts by weight for each part by weight of said complex compound of the Werner type.

11. A pressure-sensitive adhesive tape of claim 10 in which said backing is a film of polyethylene terephthalate.

12. A pressure-sensitive adhesive tape of claim 10 in which said phenolic aldehyde resin is a phenol formaldehyde resin.

13. A pressure-sensitive adhesive tape comprising a fibrous backing, a pressure-sensitive adhesive coating on one side of said backing, a back size on the other side of said backing, and on said back size a heat cured, water insoluble release coating formed in situ of an initially water soluble phenolic aldehyde resin and a complex compound of the Werner type in which a trivalent nuclear chromium atom is coordinated with an acyclic carboxylic acid having at least 12 carbon atoms, said phenol aldehyde resin being present in 0.3 to 3 parts by weight for each part by weight of said complex compound of the Werner type.

14. The method of preparing release-coated surfaces comprising preparing a solution of a water soluble phenolic aldehyde resin and a complex compound of the Werner type in which a trivalent nuclear chromium atom is coordinated with an acyclic carboxylic acid having at least 12 carbon atoms, spreading said solution on a nonabsorbent relatively smooth surface, drying said coating, and then heat curing said coating to cure said resin and said complex compound into a water insoluble release film.

15. The process of claim 14 wherein said heat curing is done at a temperature of at least 275° F.

16. The process of preparing release coatings on polyethylene terephthalate film comprising preparing an alcohol-water solution of a water soluble phenolic aldehyde resin and a complex compound of the Werner type in which a trivalent nuclear chromium atom is coordinated with an acyclic carboxylic acid having at least 12 carbon atoms, said alcohol-water solution containing at least 50 parts by weight alcohol and said solution containing 0.3 to 3 parts by weight of the phenolic aldehyde resin for each part by weight of said Werner type compound, spreading a thin coating of said solution on said film, drying said coating, and then heat curing said coating to cure said resin and said complex compound into a water insoluble release film.

References Cited by the Examiner
UNITED STATES PATENTS

| | | | |
|---|---|---|---|
| 2,147,772 | 2/1939 | Kallander | 117—68.5 |
| 2,273,040 | 2/1942 | Iler | 117—100 |
| 2,648,614 | 8/1953 | Martin et al. | 117—68.5 |
| 2,730,459 | 1/1956 | Holmen et al. | 117—68.5 |
| 2,913,355 | 11/1959 | Collins | 117—68.5 |
| 2,995,467 | 8/1961 | Webber et al. | 117—68.5 |

WILLIAM D. MARTIN, *Primary Examiner.*

RICHARD D. NEVIUS, *Examiner.*